(12) United States Patent
Nores

(10) Patent No.: US 7,527,284 B2
(45) Date of Patent: May 5, 2009

(54) FOLDING DEVICE FOR SUPPORTING OF STRUCTURES

(76) Inventor: Tomas Nores, 3404 Garden Ave., Miami Beach, FL (US) 33140

( * ) Notice: Subject to any disclaimer, the term of this patent is extended or adjusted under 35 U.S.C. 154(b) by 159 days.

(21) Appl. No.: 11/502,449

(22) Filed: Aug. 11, 2006

(65) Prior Publication Data
US 2008/0042402 A1  Feb. 21, 2008

(51) Int. Cl.
*B62B 7/06* (2006.01)
*B62B 3/02* (2006.01)

(52) U.S. Cl. ..................... 280/644; 280/642

(58) Field of Classification Search ............ 280/642, 280/644, 647, 650
See application file for complete search history.

(56) References Cited

U.S. PATENT DOCUMENTS

| | | | | |
|---|---|---|---|---|
| 2,227,780 | A | * | 1/1941 | Hickman et al. ............ 294/27.1 |
| 3,100,652 | A | | 8/1963 | Schenkman |
| 3,961,803 | A | | 6/1976 | Fleischer |
| 4,157,837 | A | | 6/1979 | Kao |
| 4,191,397 | A | | 3/1980 | Kassai |
| 4,762,256 | A | | 8/1988 | Whitaker |
| 5,183,169 | A | * | 2/1993 | Grzych ....................... 215/395 |
| 5,277,213 | A | | 1/1994 | Mitchell |
| 5,388,798 | A | * | 2/1995 | Glick ......................... 248/459 |
| 5,511,802 | A | | 4/1996 | Aitken |
| 5,687,977 | A | * | 11/1997 | Smith ........................ 280/18 |
| 5,695,212 | A | | 12/1997 | Hinkston |
| 5,695,232 | A | * | 12/1997 | Tipp .......................... 294/87.2 |
| 5,865,494 | A | * | 2/1999 | Tipp .......................... 294/171 |
| 6,095,546 | A | | 8/2000 | Austin |
| 6,152,476 | A | | 11/2000 | Huang |
| D442,085 | S | * | 5/2001 | Bozlee ....................... D9/434 |
| D451,389 | S | * | 12/2001 | Bozlee ....................... D9/434 |
| D451,390 | S | * | 12/2001 | Bozlee ....................... D9/434 |
| D452,195 | S | | 12/2001 | Baechler |
| 6,561,526 | B1 | | 5/2003 | Towns |
| 6,607,200 | B1 | | 8/2003 | Bridges |
| 6,848,665 | B1 | * | 2/2005 | Wu ............................ 248/459 |
| 6,901,635 | B1 | * | 6/2005 | Scola ......................... 16/422 |
| 6,963,484 | B2 | * | 11/2005 | Brooks et al. .............. 361/678 |
| 2003/0132614 | A1 | | 7/2003 | Kreamer |

FOREIGN PATENT DOCUMENTS

| | | |
|---|---|---|
| CA | 2201031 A1 | 9/1998 |
| CA | 2 305 846 A1 | 10/2000 |
| EP | 0 481 452 A1 | 4/1992 |
| EP | 0 894 693 A2 | 2/1999 |
| WO | WO 99/62753 A2 | 12/1999 |

* cited by examiner

*Primary Examiner*—Jeffrey J Restifo
(74) *Attorney, Agent, or Firm*—Crowell & Moring LLP

(57) ABSTRACT

A device comprising an elastically deformable body (1) having an opening (2) that defines two pliable portions (3; 4) consisting of a central portion (3) and a surrounding portion (4) that are capable of being folded relative to each other to form a supporting means that is adaptable to various structures such as baby strollers, cargo carts, golf club-bag carrying carts, and the like. Since the body (1) of the device is elastically deformable, the central portion (3) and the surrounding portion (4) can be bent to such an extent that the body may (1) reach a great variety of desired shapes for acting as truly foldable carrier devices.

22 Claims, 20 Drawing Sheets

FOLDING DEVICE FOR SUPPORTING OF STRUCTURES

FIELD OF THE INVENTION

The present invention is related to the field of supporting elements to be incorporated into small mobile, portable or movable transport devices.

More in particular, the invention relates to a foldable device for supporting of structures which, based on its elastic force, can be used in various types of devices such as baby strollers, cargo carts, golf club-bag carrying carts, bearing plates, movable drawing boards, musical instrument pouches and the like, which can be hand carried or motor driven.

DESCRIPTION OF THE STATE OF THE ART

Several supporting means such as golf club-bags baby seats, goods or any other movable element are well known in the art. These known supporting means generally comprise frames or framework structures made up by tubular elements on which the rest of the elements forming the structure are mounted. These types of supports require various connecting elements such as joints and hinges, which reduce its stability, using a large number of members and requiring considerable hand labour for being made. Examples of documents disclosing such elements are: CA 2,201,031 A1, CA 2,305,846 A1, WO 99/62753, EP 0 481 452 A1, EP 0 894 693, among others.

Other known types of supports are based on elements that are formed with permanent folds or pleats, which reduce their adaptability to different applications.

For example, U.S. Pat. No. 5,277,213 discloses a foldable canopy comprising a top member, a back member and a pair of side members that are formed from a single foldable member. This canopy is commonly applied to a foldable flat object, which does not rely on the elastic properties of the material, but it rather depends on its capability to be permanently collapsible for folding or unfolding. Moreover, the shape of the foldable flat material is only useful as a canopy, though it lacks other elasticity properties to provide further advantages or adaptability to different applications.

Other documents describing baby strollers wherein part of the structure is comprised of a foldable surface (made of plastic or cloth) are listed below:

U.S. Pat. No. 3,100,652 discloses a collapsible baby stroller comprising a rectangular seat made of a flexible material that is supported on several points and has a framework that is comprised by two forwardly extending rods and two backwardly extending rods, each of one ends in one of the four wheels of the stroller. The structure has the advantage of allowing the seat to be closed and it can be folded in half together with the frame, so that the stroller does not take much room when not in use.

U.S. Pat. No. 3,961,803 discloses a baby carrier portable device which, according to the document, can take the form of a stroller, baby seat, car baby seat, sleeper-stroller, high chair and the like, according to user's need.

U.S. Pat. No. 4,157,837 discloses a baby stroller that can be folded such that it turns into a baby seat and it can be carried by an adult on his/her back as a backpack.

U.S. Pat. No. 4,191,397 discloses a baby stroller that can be folded to take a completely flat shape.

U.S. Pat. No. 4,762,256 discloses a device that can be used either as a baby stroller or as a backpack.

U.S. Pat. No. 5,511,802 discloses a baby stroller, which uses only one wheel and it is comprised by a frame and a seat made of a flexible material.

U.S. Pat. Nos. 5,695,212, 6,095,546 and 6,152,476 and US Patent Application 2003132614 all disclose baby strollers having three wheels, a collapsible frame and a detachable seat made of cloth.

U.S. Pat. No. 6,561,526 B1 discloses a baby stroller including a housing for storing a foldable supplementary seat, which can be used by the baby carer.

U.S. Pat. No. 6,607,200 discloses a device usable to carry babies who are too large to being able to travel in a conventional baby stroller.

Industrial Design Pat. U.S. D 452,195 S shows a baby stroller, in which both the back and sides are formed of a flexible material, for example a cloth.

However, none of the above mentioned documents discloses a carrying device comprised by a resilient body such as the one claimed in the present invention.

None of these known devices is based on the use of elastically collapsible materials, of certain shapes and with foldable portions that can take different shapes and are usable as support elements for other structural members.

SUMMARY OF THE INVENTION

The present invention relates to a foldable device useful for supporting structures to be used in baby strollers and prams, golf-club carts and generally to transport light objects. The invention comprises an elastically deformable body in which a partial opening defines two portions that fold against each other. In a first embodiment, these foldable portions comprise a central portion and a surrounding portion which, when folded, can be adapted to be used as supports for structures on which baby seats or collapsible seats can be mounted, and which can also be used for carrying drawing boards, golf-club bags, musical instruments, and the like. In a second embodiment, the foldable portions comprise a pair of side foldable portions and a clamping central portion.

Objects and Advantages of the Present Invention

It is an object of the present invention to provide a foldable device which is based on an elastically deformable body which may take various forms to be used as a support for structures such as carrying or cargo carts, bearing plaques, drawing boards, musical instruments, and the like.

It is another object of the invention to provide a foldable device, the elastic deformation of which allows, once its been collapsed, to regain its initial slightly bent or completely flat shape, whereby occupying less space and can be easily carried or stored.

It is one advantage of the present device that its elastic deformability and the presence of anchoring means allow it to adopt and maintain various configurations, as required by the structure it is applied to.

Another advantage is that the free ends of its body portions may serve as simple supporting or ground anchoring ends, as engagement means to any surface or, preferably, to attach rolling elements such as wheels or the like.

Another advantage is that it can be made of inexpensive materials such as, for example, plastic materials.

A further advantage of the present device is that its very easy and economical to manufacture due to the fact that, based on an elastically deformable body, its main members are formed bye a "U-shaped" slot or by two longitudinal slots.

Still another advantage is that it allows for a simpler manufacturing process, due to the fact that the end device is composed of a lesser amount of members.

BRIEF DESCRIPTION OF THE DRAWINGS

For a better simplicity and comprehension of the object of this invention, it is hereby illustrated by means of several figures wherein it has been shown in one of the preferred embodiments thereof, and which should be interpreted as illustrative only, and not limitative.

In the various figures the same reference numbers indicate the same or corresponding parts, and groups of several members are indicated with letters.

Figure 2:
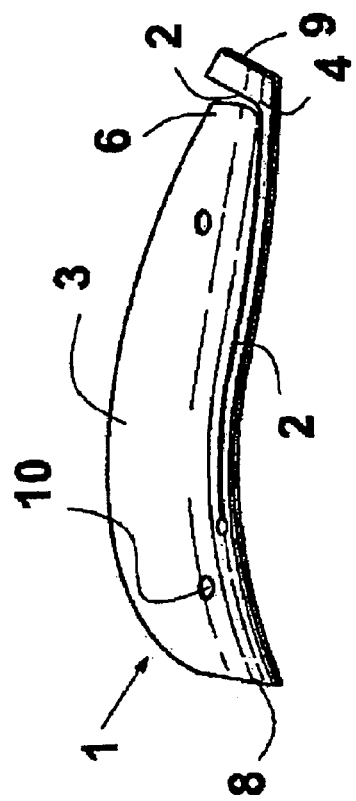
FIG. 2 is a side view of the prototype of FIG. 1 in its resting position.
Figure 1:
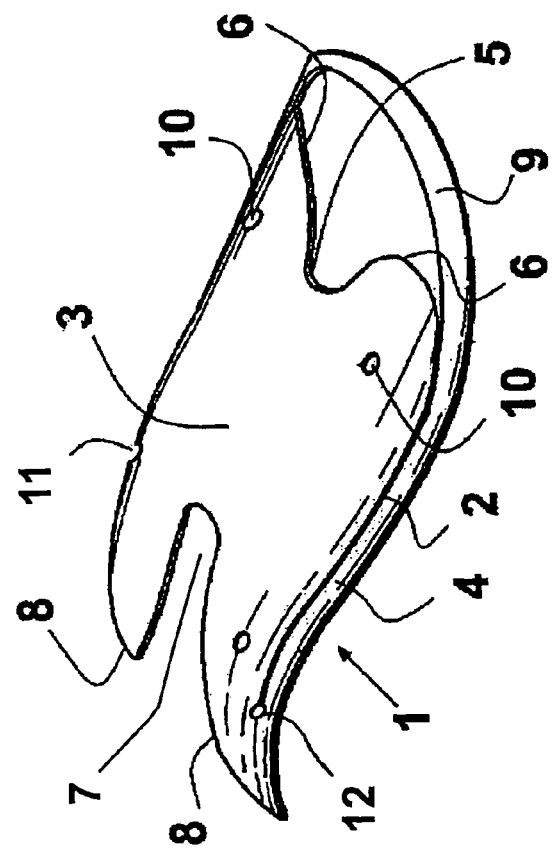
FIG. 1 is a perspective view of a first embodiment of a test prototype of the present device, having a slightly convex shape.

Number References Throughout the Drawings:
(1) Elastically deformable body
(2) Surrounding partial opening
(3) Flexing portion
(4) Surrounding portion
(5) Back recess
(6) Convex ends
(7) Front recess
(8) Front extremities
(9) Connecting extremity
(10) Anchoring holes
(11) Convexity of the elastically deformable body
(12) Pivot point
(13) Anchoring rings
(14) Retaining elements (cleats)

DETAILED DESCRIPTION OF THE INVENTION

In a first embodiment, this invention relates to a foldable device for supporting of structures comprising an elastically deformable body 1 and having a convexity 11, and in which a partial surrounding opening 2 defines two foldable portions 3, 4. In this first embodiment, such foldable portions 3, 4 consist of a central portion 3 and a surrounding portion 4, which are foldable against each other, thus forming a supporting means adaptable to various structures such as carrier or cargo carts, collapsible seats, drawing boards, musical instruments, and the like, which will be more readily seen in the following figures.

FIG. 2 allows seeing in greater detail the longitudinally arched profile and the convex shape of the first prototype and its overall shape in a resting position.

Figure 3:
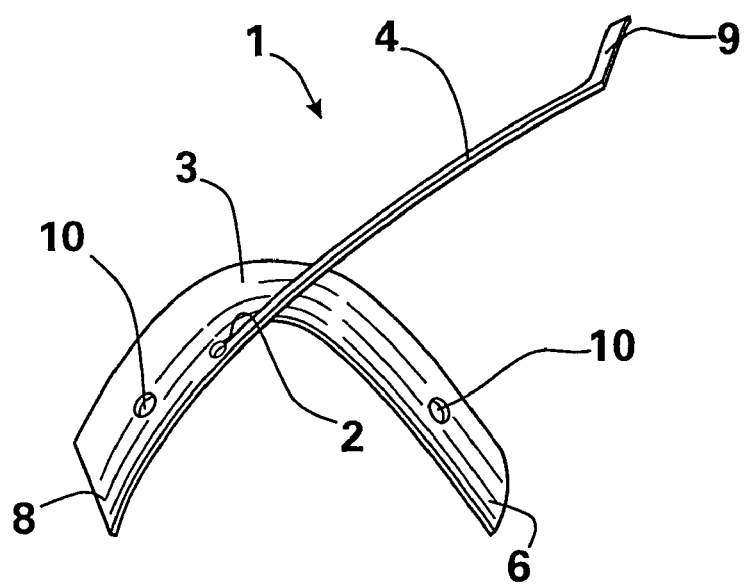
FIG. 3 is a side view of the prototype of FIG. 1 with its surrounding portion in a flexed position.
Figure 6:
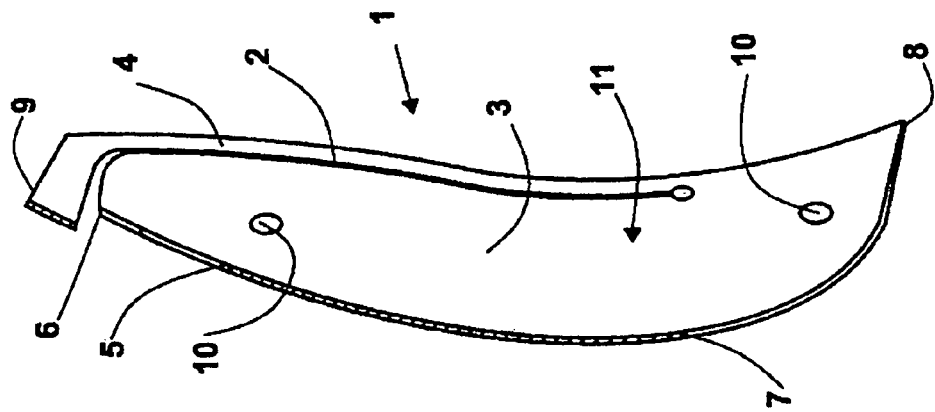
FIG. 6 is a longitudinal section of the present prototype, along a line indicated as VI-VI in FIG. 4.
Figure 4:
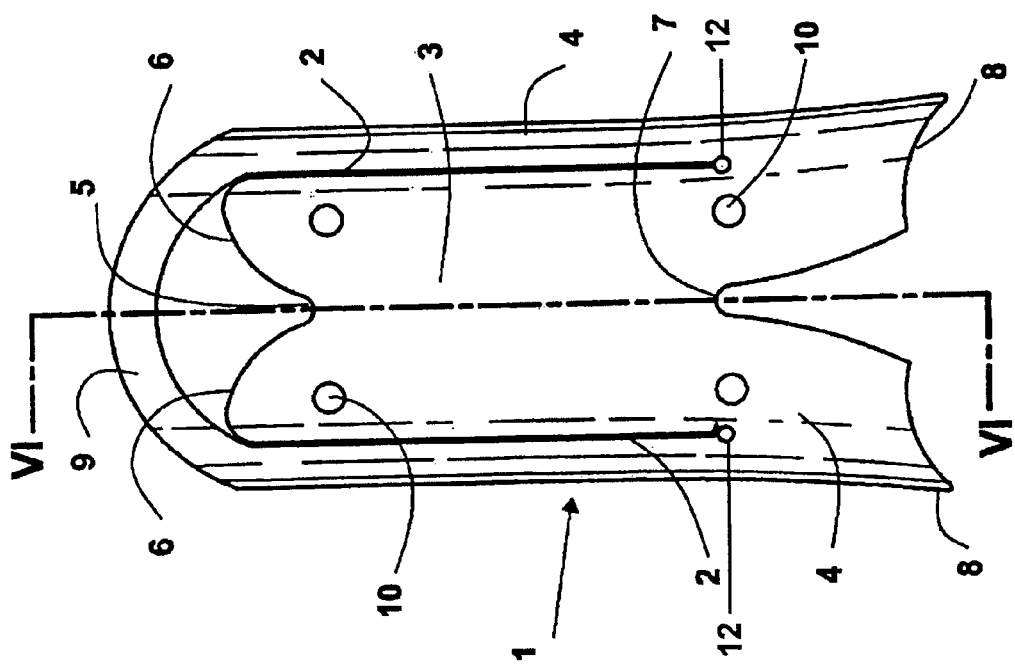
FIG. 4 is a top plan view of the prototype of FIG. 1 in its resting position.
Figure 5:
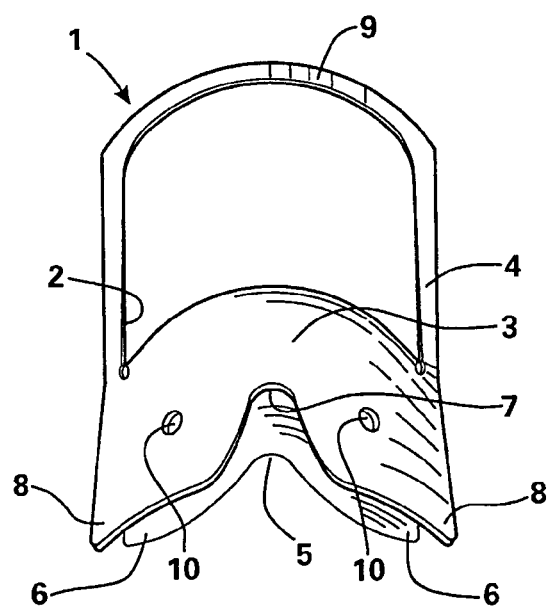
FIG. 5 is a front view of the prototype of FIG. 3 with its surrounding portion in a flexed position.

The initial flexure tests between both portions were performed as shown in FIG. 3, since such stress directly affects the pivot points 12, these being the weakest points due to the fatigue stress of the material. The prototype was mounted on fatigue test apparatuses (not shown in the figures) such that the flexure movement was cyclically repeated and the testing thus allowed selecting the materials for manufacturing of the final product in a more suitable manner. In FIG. 5, it is shown the shape of the prototype upon folding the surrounding portion 9 with respect to the central portion 9 in the torsion fatigue tests.

Subsequently, the test of the longitudinal folding of the central portion about a transverse axis was carried out, because this stress is a major factor in the usage of the device of the present invention. In this testing it was found that, while the slightly convex shape of this first embodiment gave the member a higher stress strength under heavy loads, it also increased undesirably the force required for folding the member in that direction. Therefore, for certain applications, it was necessary to develop a second preferred embodiment with a similar prototype (FIG. 7A), but with a flat body.

In all four embodiments, the present device relies on an elastically deformable body, which can be built from any material capable of being elastically deformed within the elasticity range according to Hooke's law.

The selection of the suitable materials to be used in the present invention is crucial. Various materials can be used, such as metals (e.g. aluminium, titanium or phosphorous bronze for its high resilience), fiberglass, carbon fiber, epoxy, elastomers or various types of polymers. However, within the wide range of materials that can be used, there are some that are more suitable than others due to certain qualities that affect the performance of the device. While the metal options provide great surface hardness, great resilience and fatigue strength, their heavy weight and the cost make them suitable only for certain embodiments of the device that are subjected to very heavy loads.

En a first preferred embodiment, four prototypes were built (convex, planar and with an outwardly folding portion) from fiber glass and layers of polyester resin interposed in between. This material is chosen on account of its reasonable cost, ready manufacture and excellent elasticity features. In the first prototype, 2 mm thick unidirectional layers of fiberglass reinforce polymer were used, but containing fibres oriented in various directions. In the uppermost layer the fibers used were oriented in one direction and in the other layer, fibers were arranged in a perpendicular direction to these and then they were bound with a polyester resin. Using methods known by those skilled in the art, the anisotropic elastic module of each layer provided acceptable values in the longitudinal, transverse and crosswise direction of the sheet.

In order to bind the sheets of fibreglass to each other, a polyester resin approved under Lloyds standards was used, being 10% tixotropic and particularly suitable for these applications and a catalyst was added, whereby the curing time at 20° C. using 2.2% thereof was about 20 minutes, resulting in a slightly clear hue. This surface finish is very useful to allow for pigments to give the device a commercially attractive appearance. The most widely used pigments are obtained as a paste but they must be provided in limited amounts, because they tend to degrade the elastic properties of the material. A 6% addition should be enough, and it should never exceed 10% of the total mass. The catalyst added, e.g. an MEKP type, ranges from 1-3%, preferably ca. 2% (20 ml per kg resin) and it needs to be used for starting the resin curing process. It must be handled with care because it is a highly corrosive material. In some cases the curing time can be shortened by using small quantities of accelerators, which must be added and mixed in thoroughly before the catalyst is added, because if these are brought into direct contact, a highly exothermic process can take place, thus generating an explosion or a fire.

In a further embodiment, the prototype was made from a synthetic elastomer, the styrene-butadiene-type rubber (SBR), also known as "Buna-S". While the material has shown to be outstandingly elastic, for commercial reasons it is only used for industrial applications because the surface finish of the rubber gives the device a less appealing appearance.

In another highly preferred embodiment, prototypes were built from materials selected from polymers. Among the various types of polymers, there can be found plastic materials such as low density polyethylene (LDPE), a material widely used in the manufacturing of bags, containers, textiles, electric insulation, package wrappers, etc., high density polyethylene (HDPE), a more rigid material used to make tubing, bottles, container lids, etc, and polyethylene materials such as HMW and UHMW, which are too rigid for this application.

Among the available polymers, the first testing of the prototype was performed with Lexan®. This material is a thermoplastic polycarbonate resin widely used because of its high elasticity, surface strength and high fatigue strength features in a lot of applications ranging from hand tool housings, kitchen appliances, security lenses, computer or audio CDs, bulk drinking liquid bottles, all the way to transparent home partition walls. According to some manufacturers, Lexan® can withstand temperatures ranging from −40° C. to +125° C., it endures the effect of ultra violet light, its is fire resistant as per the Underwriters Laboratories UL standard 94V-0 I and UL 94 V-2 and it is FDA approved. Furthermore, its surface finish allows making completely transparent products, or with the addition of pigments, it can incorporate a wide range of colors. The elasticity of the commercially available Lexan® sheets have an elastic module of 2.3 to 2.6 Gpa. Finally, a prototype of the well known polyester polymer called Polyethylene terephthalate (PET) was made, also with acceptable results.

In the following Table 1 a comparative chart of several types of polymer is shown. The skilled in the art will understand that the selection of the most suitable material will depend on the desired thickness of the body of the device, but the table is highly convenient to help selecting equivalent materials for this application.

TABLE 1

| Property | Units | Styrene ABS | Polyphenylene oxide-styrene Noryl | Polyphenylene oxide-styrene (filled with 30% glass) 30% Noryl | Nylon MD and MDS |
| --- | --- | --- | --- | --- | --- |
| Flexural strength | Kpa | 75.845 | 93.085 | 137.900 | 113.078 |
| Shear strength (22.8° C.) | Kpa | — | — | — | 75.845 |
| Flexural elastic modulus (22.8° C.) | Gpa | 2.275 | 2.482 | 7.5845 | 2.758 |

| | | Nylon | | | Polyethylene King Starboard |
| --- | --- | --- | --- | --- | --- |
| Property | Units | Nylon 6 or Nylatron ® | NMS Nylon | GSM Nylon | Marine Grade |
| Flexural strength | Kpa | 96.53 | 110.32 | 113.078 | — |
| Shear strength (22.8° C.) | Kpa | 66.192 | 68.950 | 75.845 | — |
| Flexural elastic modulus (22.8° C.) | Gpa | 2.826 | 3.275 | 2.826 | 0.8274 |

| | | Polyethylene | | | |
| --- | --- | --- | --- | --- | --- |
| Property | Units | HDPE | UHMW | LDPE | Polysulfone |
| Flexural strength | |Kpa | 9.653 | 24.132 | — | — |
| Shear strength (22.8° C.) | Kpa | 23.305 | — | — | — |
| Flexural elastic modulus (22.8° C.) | Gpa | 1.379 | 0.758 | — | 2.689 |

| Property | Units | Polypropylene | Delrin ® Acetal | Type 1 PVC | Hydex 4101 and 4101L |
| --- | --- | --- | --- | --- | --- |
| Flexural strength | |Kpa | 48.265 | 98.598 | 86.187 | — |
| Shear strength (22.8° C.) | Kpa | 39.301 | 65.502 | 63.710 | — |
| Flexural elastic modulus (22.8° C.) | Gpa | 1.241 | 2.930 | 2.896 | 2.896 2.689 |

TABLE 1-continued

| Property | Units | PET-P | PEEK | Teflon | Clear Materials Polycarbonates Lexan ® Hyzod ® |
|---|---|---|---|---|---|
| Flexural strength | lKpa | — | 169.962 | no rupture | 82.740 |
| Shear strength (22.8° C.) | Kpa | 55.160 | 53.022 | — | 63.434 |
| Flexural elastic modulus (22.8° C.) | Gpa | — | 4.099 | 0.689 | 2.585 |

| | | Clear Materials | | |
|---|---|---|---|---|
| Property | | Perspex | Acrylic | PALSUN ® PALTUF ®-type Polycarbonates |
| Flexural strength | Kpa | 117.215 | 117.215 | — |
| Shear strength (22.8° C.) | Kpa | — | — | — |
| Flexural elastic modulus (22.8° C.) | Gpa | 2.758 | 2.758 | — |

From the table it can be seen that the plastic materials with similar characteristics to those of Lexan® are Nylon 6, Delrin®, Acetal and type 1-PVC.

While Nylon appeared to be a valid option because of its high elasticity, it was rejected due to the fact that, once the elastic limit was exceeded, the material would not return to its initial position.

Based on these major features of the present invention, further prototypes have been built from Delrin®, Acetal and type 1-PVC, and similar results were obtained, all of them acceptable for the manufacture thereof.

All the prototypes were made by the well known molding technique, though the skilled technician will understand that there are various techniques to form these parts.

Among the most widely used methods to measure polymer hardness is the SHORE method. However, in this application, as stated above, it is not as crucial to measure the surface hardness of the material, but it is of most importance to establish the torque required by the user to fold the device and the strength the tensors will require to keep it in such position.

In further prototypes other highly preferred materials were used. Making good use of the well known techniques used in the construction of snow skis and snowboards several prototype devices were constructed with multi-layer materials. The usage of combination of glued layers of metal/plastic and metal/wood is well known and very much used in the art because it shows much better elastic properties than pure metal sheets. Some prototypes were tested, made up of three layers: two layers of 1/32 inch thick aluminium with a plastic 1/16 inch in-between layer forming a combined sheet with a thickness of approximately 5/32 inches. The intermediate plastic layer materials were chosen from the plastic materials discussed in the previous paragraphs, for example the family of polycarbonates. A further second version prototype was built with another combination of materials; two layers of 1/32 aluminium with a wooden 1/36 layer in-between, resulting also in an approximate thickness of 5/32 inches (disregarding the small additional thickness of the glue layer). Further prototypes were tested comprising two layers of 1/32 thick plastic materials with a 1/16 aluminium layer in-between, having the advantage that the external plastic layers protect the relatively soft aluminium layer from scratches and harsh strokes. All these versions showed satisfactory elastic behaviour although the aluminium-polycarbonate-aluminium combination showed a better resilience but less torsion and flexing resistance. Other metals were also tested with these multilayered prototypes such as phosphorous bronze but, due to high cost and weight, these were disregarded.

In a second prototype, which is a second most preferred alternative embodiment, the aforementioned elastically deformable body 1 has a flat body when not in use. This configuration allows the elastically deformable body 1 to be less rigid in its resting position while it also allows it to be easily folded when it must be operated as a means of transportation.

Figure 7A:
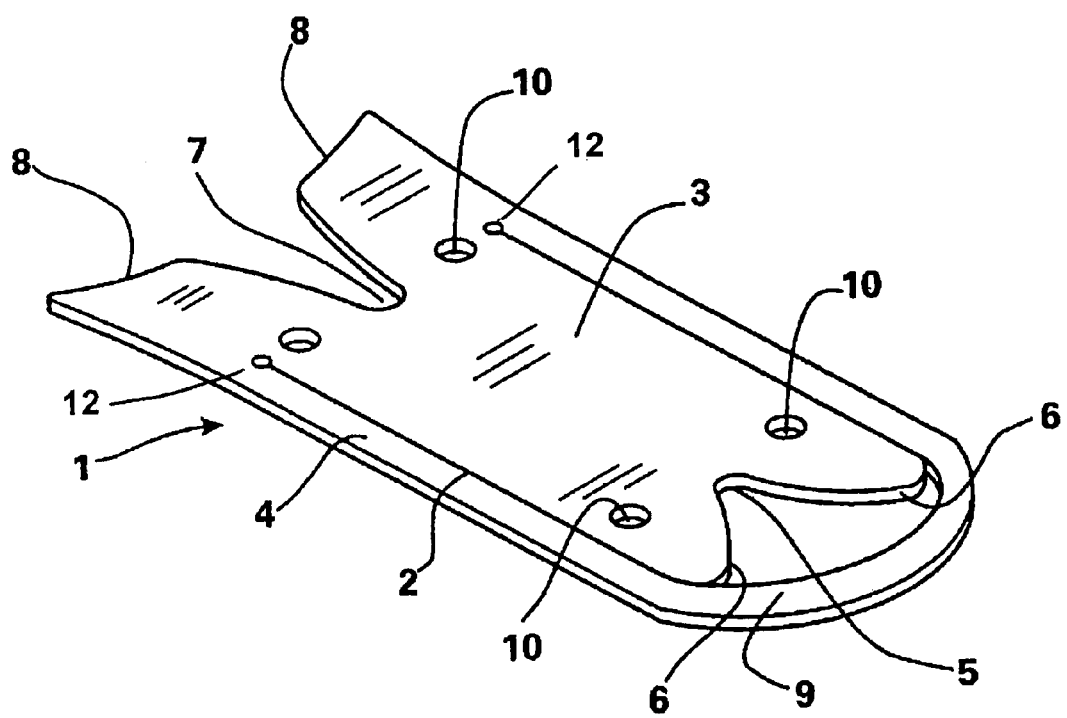
FIG. 7A is a perspective view of another prototype of the invention.

FIG. 7A shows that, in the second prototype, the aforementioned elastically deformable body 1 has an opening or surrounding partial slit 2 therethrough, which, in the present embodiment, has a "U" configuration. This partial opening 2 defines two portions 3 and 4, and a central portion 3 located in the central part of the body 1, and a surrounding portion 4 around the central portion 3. In other alternative embodiments (not shown in the drawings) the surrounding partial slit has side paths that are not straight as the ones shown in FIG. 7A, but they have been designed with alternative shaped paths such as: winding, parabolic, zig-zag-shaped straight lengths (recessed and protruding teeth) and in the shape of saw teeth (only recessed or only protruding teeth) inserted between straight length portions. All these variations (not shown) directly affect the stiffness of the central body when flexed to actuate the device and the degree to which both portions nest into each other.

Figure 7B:
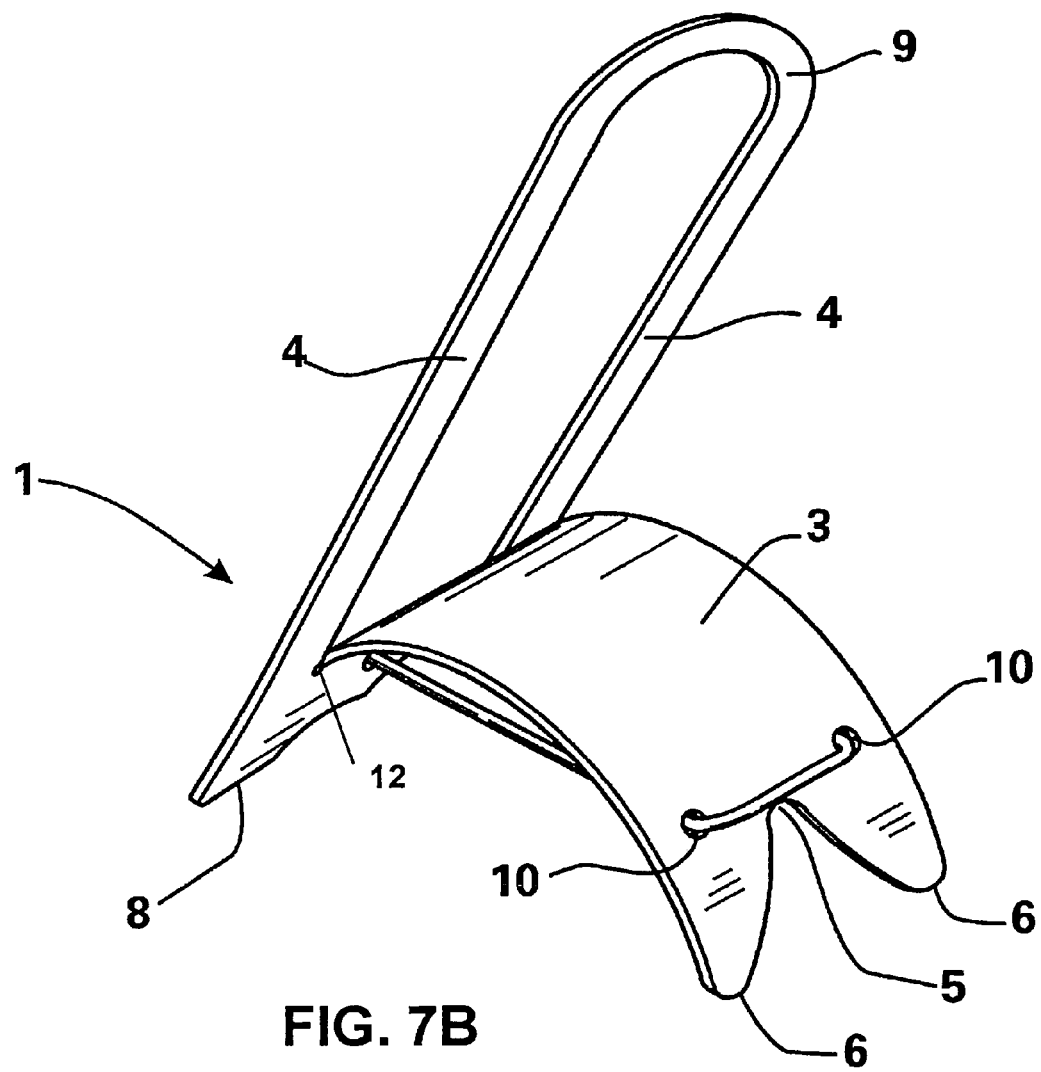
FIG. 7B shows a perspective view of the prototype of FIG. 7A with its central portion in a folded position and its tensors actuated.

In FIG. 7B it can be seen that both portions 3 and 4 are elastically bendable such that they can adopt various relative positions relative each other. For fastening its position anchoring means were included, for preventing the assembly from returning to its resting position because of the elastic energy accumulated when it is bent. For instance, in the present embodiment, anchoring holes 10 suitable for mounting the filiform tensor elements such as cords, ropes, cables or wires were supplied, being these capable of keeping portions 3 and 4 of the body 1 folded. Those skilled in the art will readily understand that the user only needs to pull the tensors and conveniently fasten them for urging portions 3 and 4 to maintain their position, so that the invention is used as a transport device. A further preferred embodiment, not shown in the drawings, keeps both portions in its bent position by incorporating retainer elements such as small metal rings anchored on the inner surface of the main body and linked to each other by rigid rods, which have a hook-shaped end and a ring at the other end, such that the rods can be linked in a pivotal fashion. In this way the user can bend the portions to each other and insert the rods into the appropriate ring such that the assembly is kept in a bent position.

Figure 8:
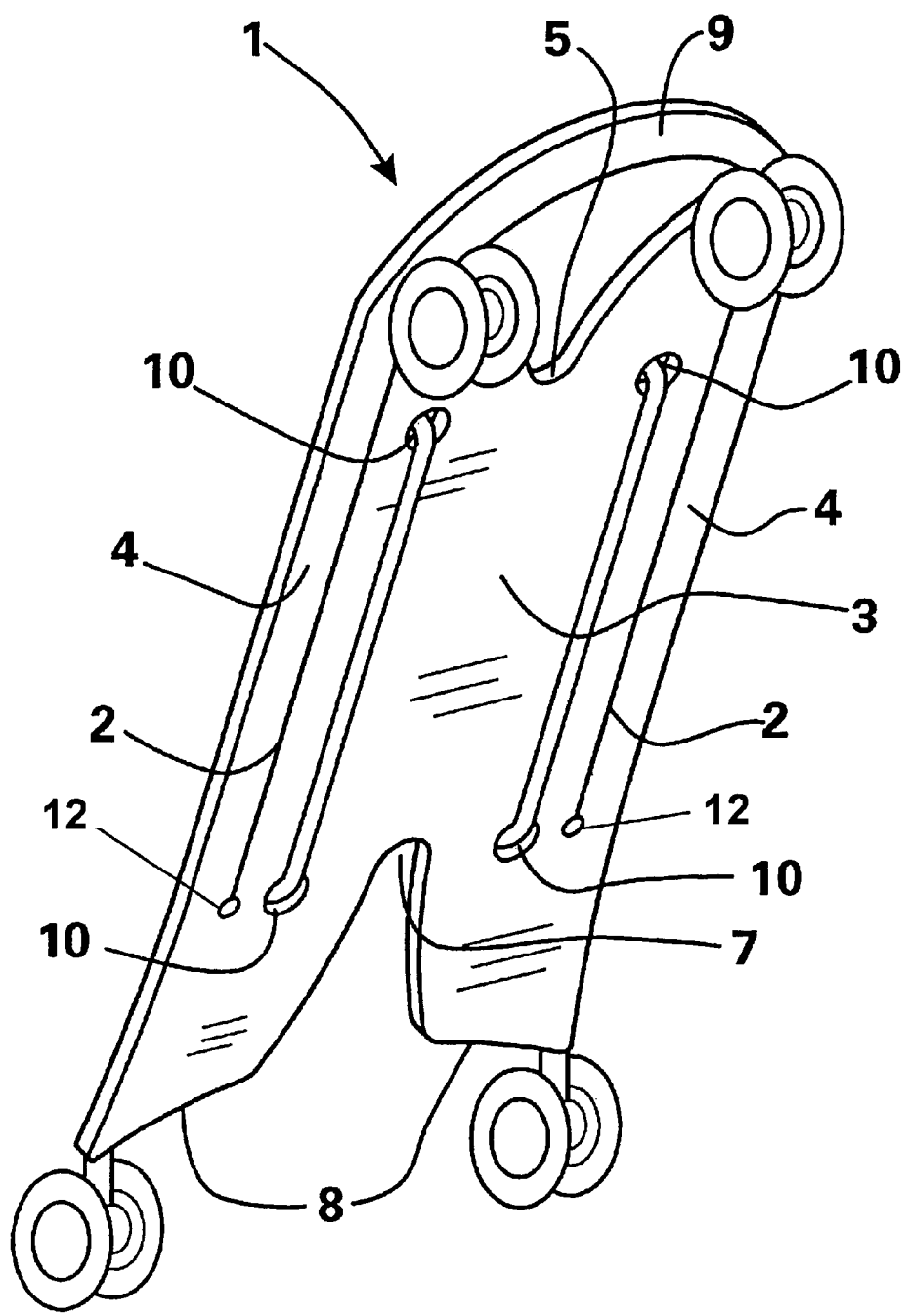
FIG. 8 shows a perspective view of the prototype of FIG. 7A in its resting position and with wheels attached to it.
Figure 9:
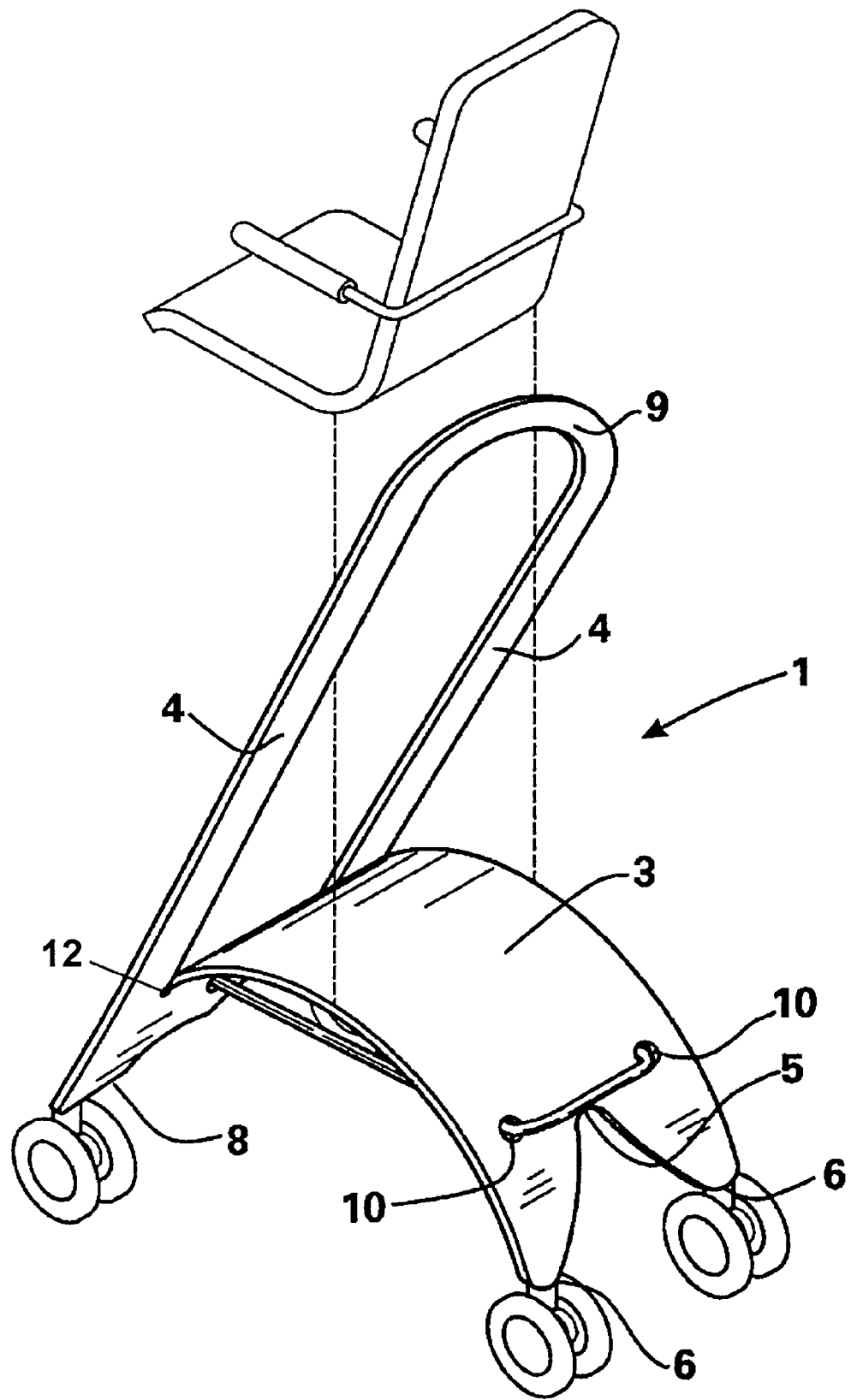
FIG. 9 shows a top perspective view of the prototype of FIG. 7A in its folded position and used to mount a seat thereon.

FIG. 7A shows the ends 6, 8, 9 on the free ends of both portions 3 and 4 were supplied. For example, in the case of the central portion 3 there is a back recess 5 from which two backward convex ends 6 extend. For the surrounding portion 4 there is a front recess 7, from which two front extremities 8 are supplied. In FIGS. 8 and 9 it may be seen that these ends 6 and 8 are the zones designed to attach the optional rolling means on which the device will be moving.

In FIG. 9 it can be seen that the side opposite the ends 8, i.e. portion 9, will allow the user to hold the device to steer it and push it when used.

Figure 12:
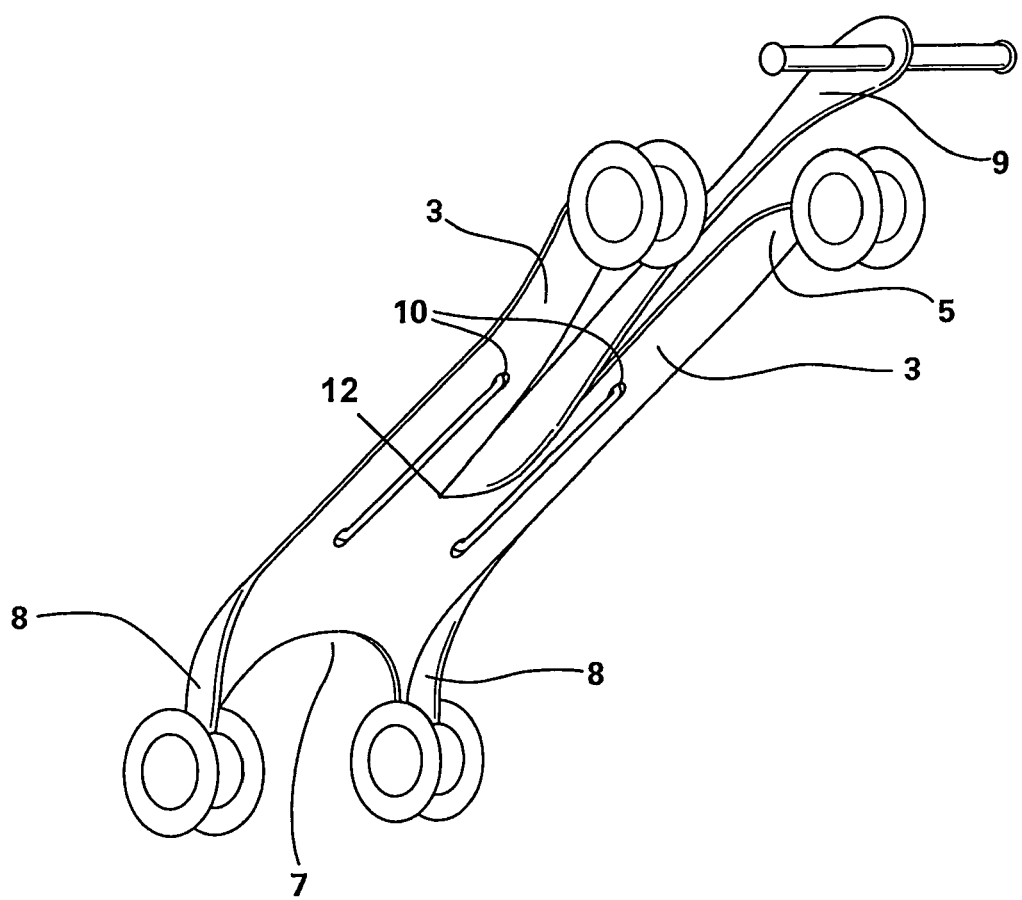
FIG. 12 is a lower perspective view of a third embodiment of the device of this invention in a resting position, ready for being carried.
Figure 13:
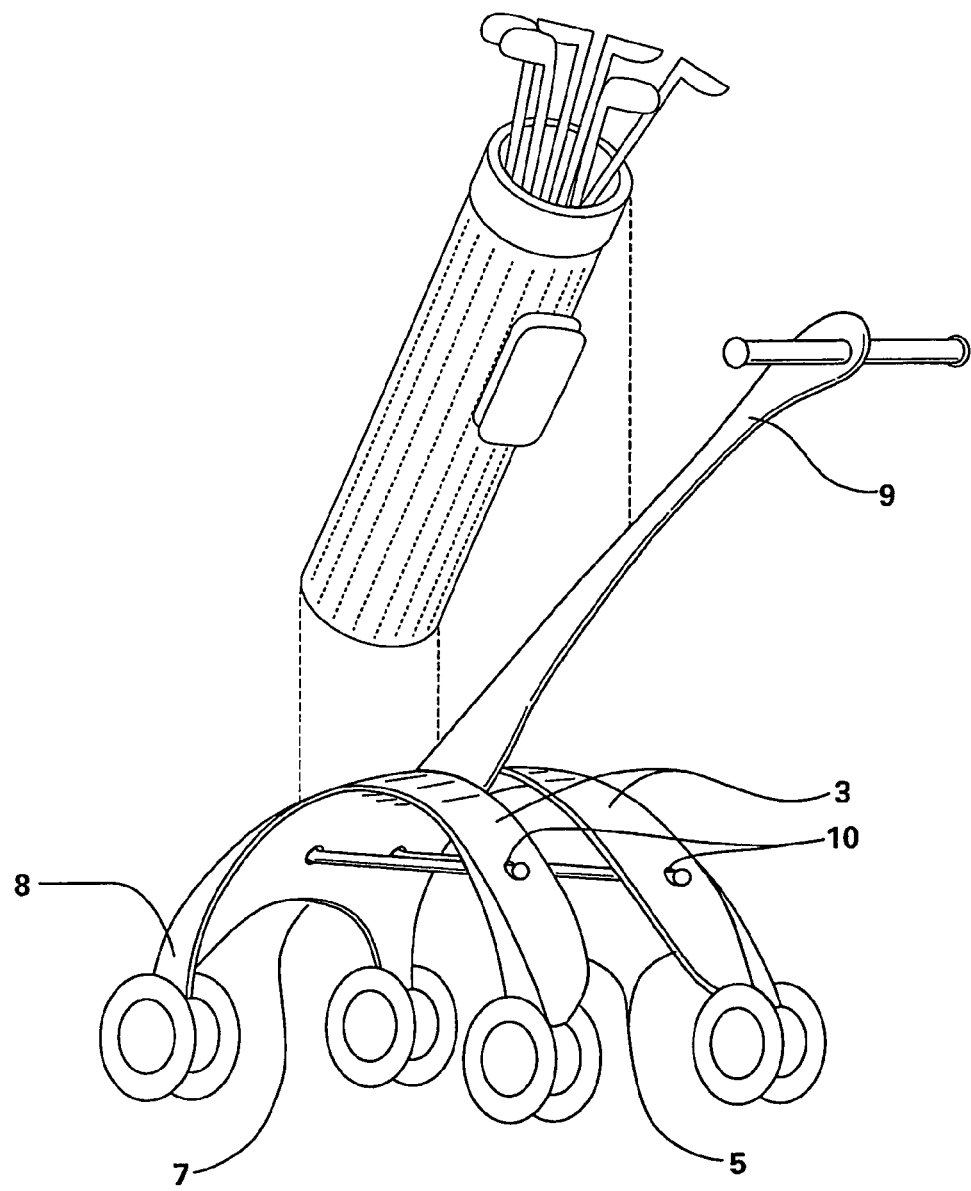
FIG. 13 is a perspective view of the prototype of FIG. 12 in a folded in-use position, in the form of a golf-club carrying cart.

FIGS. 12 and 13 show a third prototype comprising a third most preferred embodiment of the present invention. In the drawings it is clear that the inventive concept of the first and second prototype is kept, but with the addition of an important change by comprising a member that is flat when resting and in which the central portion 9 is held in an upright position, thus supplying a handle, and the side portions 3 are bent such that the device can be actuated for becoming a means of transportation. It may be seen that this third embodiment is also based on a flat body and the advantage it has over the other two embodiments disclosed above is that the folding of the side portions requires from the user exerting smaller force on it, becuase each one has only half the material quantity. On the other hand, however, the folding of both portions is somewhat more cumbersome and it requires the user to be a little more skilful.

A fourth preferred embodiment (not shown in the drawings) relies on a member similar to those in FIGS. 12 and 13, but of an arched shape, as with prototypes in FIGS. 1-6.

FIGS. 12 and 13 show that the two slots defining the central portion of the handlebar and both bendable side portions are approximately longitudinal to the elastic body and the wheels are attached at the ends of such side portions.

It should be emphasized that FIG. 12 shows a handle that is approximately perpendicular to the plane of the remainder of the elastic body. However, in a preferred embodiment, the handle has a shape that is coplanar to the rest of the elastic body, whether in its convex form or its flat form. The advantages and disadvantages of each embodiment should be apparent to a person with ordinary skill in the art, since each one has a certain resistance to flexing strain on each plane. The embodiment shown in FIG. 12 obviously shows a greater moment of inertia in the vertical direction and it will therefore be more resistant to bending stress in that direction while less resistant to lateral bending stresses.

INDUSTRIAL APPLICATION OF THE INVENTION

Figure 10A:
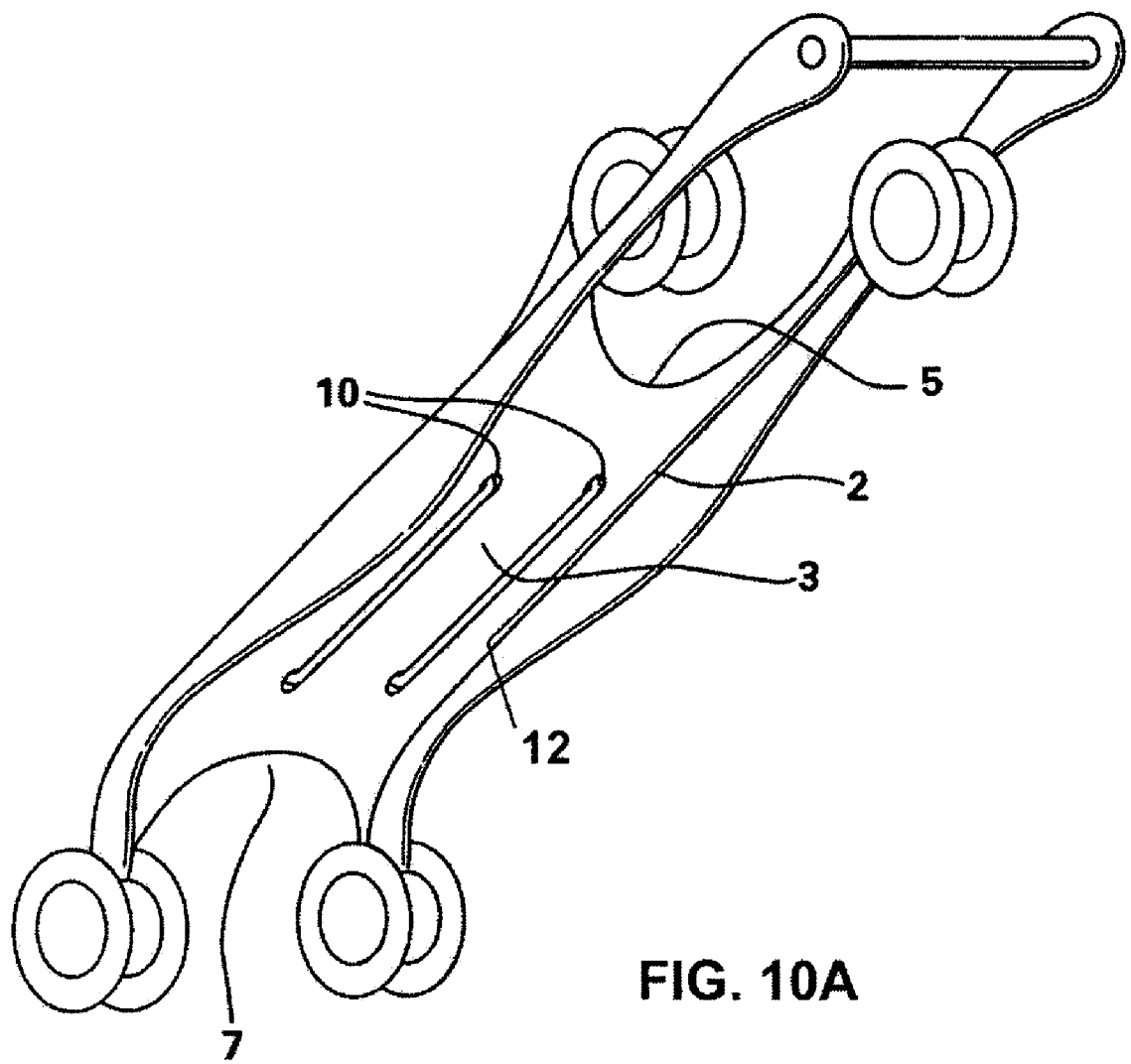
FIG. 10A shows a rear perspective view of a baby stroller based on the second preferred embodiment of this invention in its resting position.
Figure 10B:
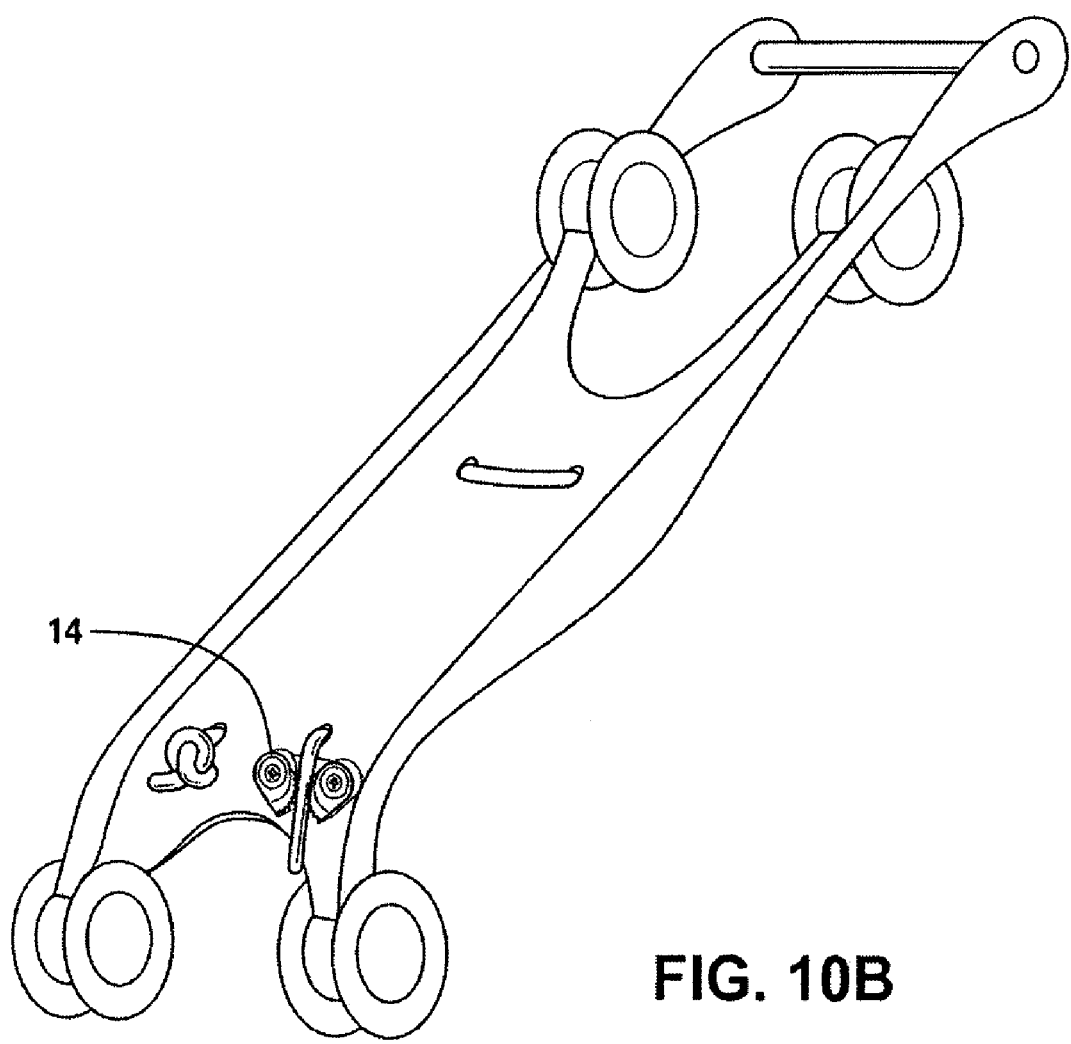
FIG. 10B shows a front perspective view of the baby stroller based on the second preferred embodiment of this invention in its resting position, showing a first embodiment of retaining means.
Figure 11A:
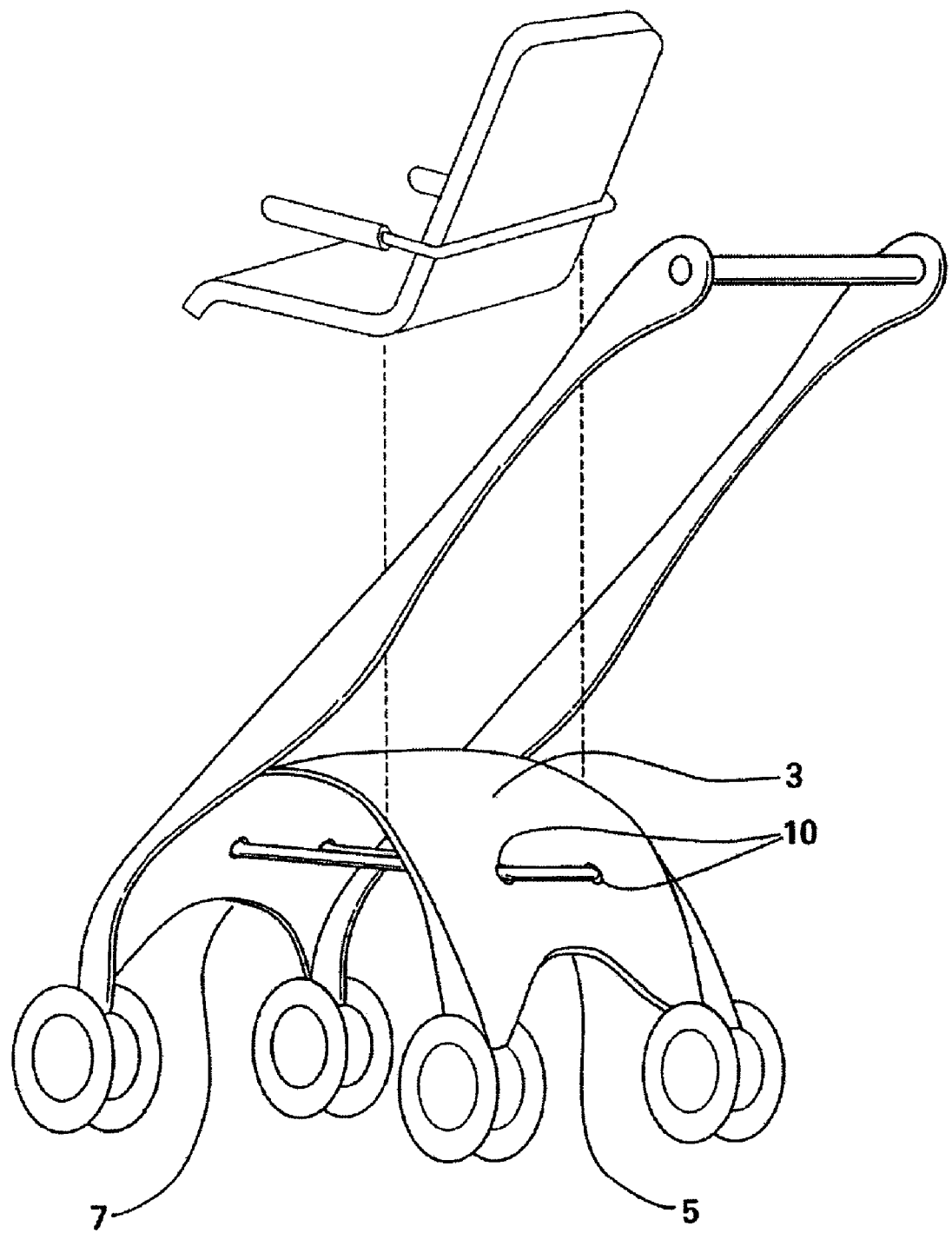
FIG. 11A is a rear perspective view of the stroller of FIG. 10A in its in-use position, showing the seat arrangement.
Figure 11B:
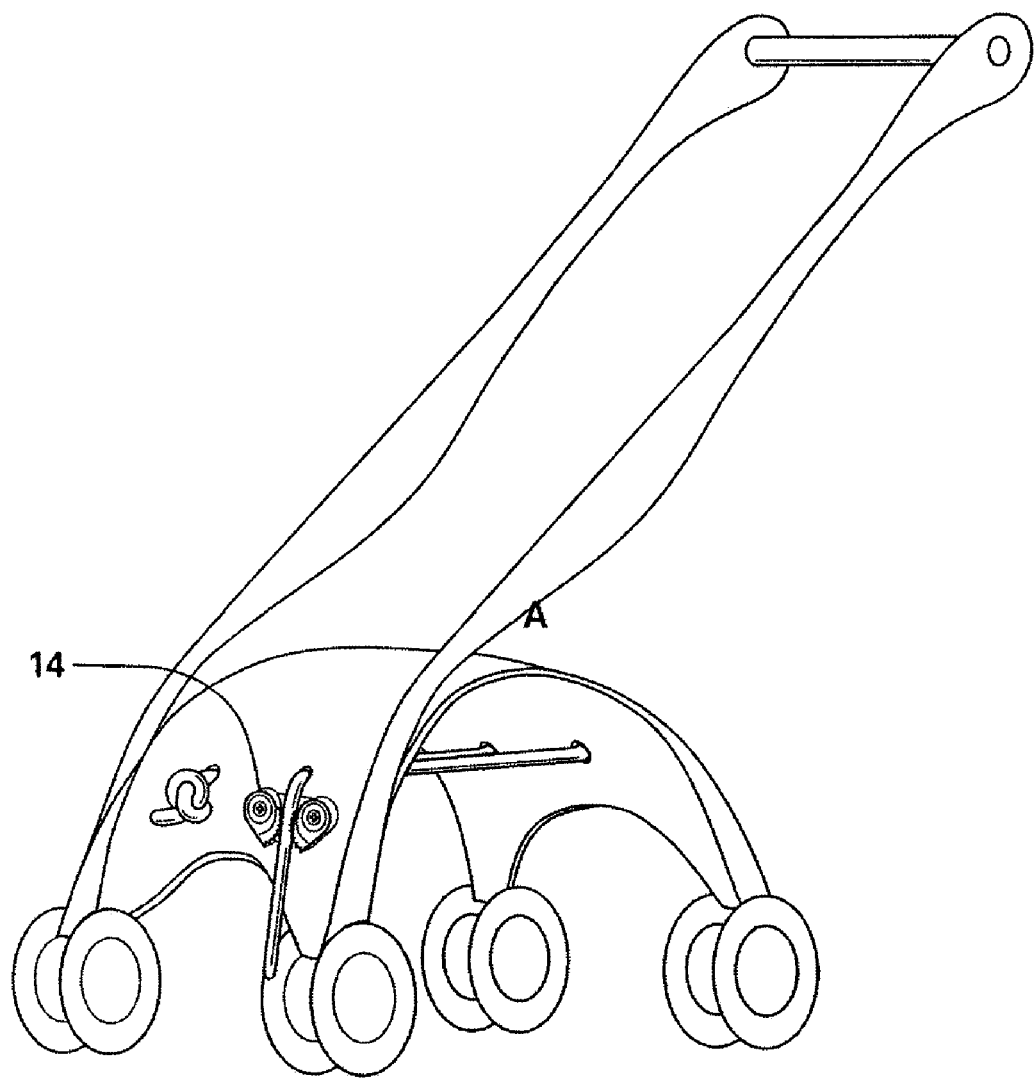
FIG. 11B is a front perspective view of the stroller of FIG. 10B in its in-use position, without the seat arrangement.
Figure 11C:
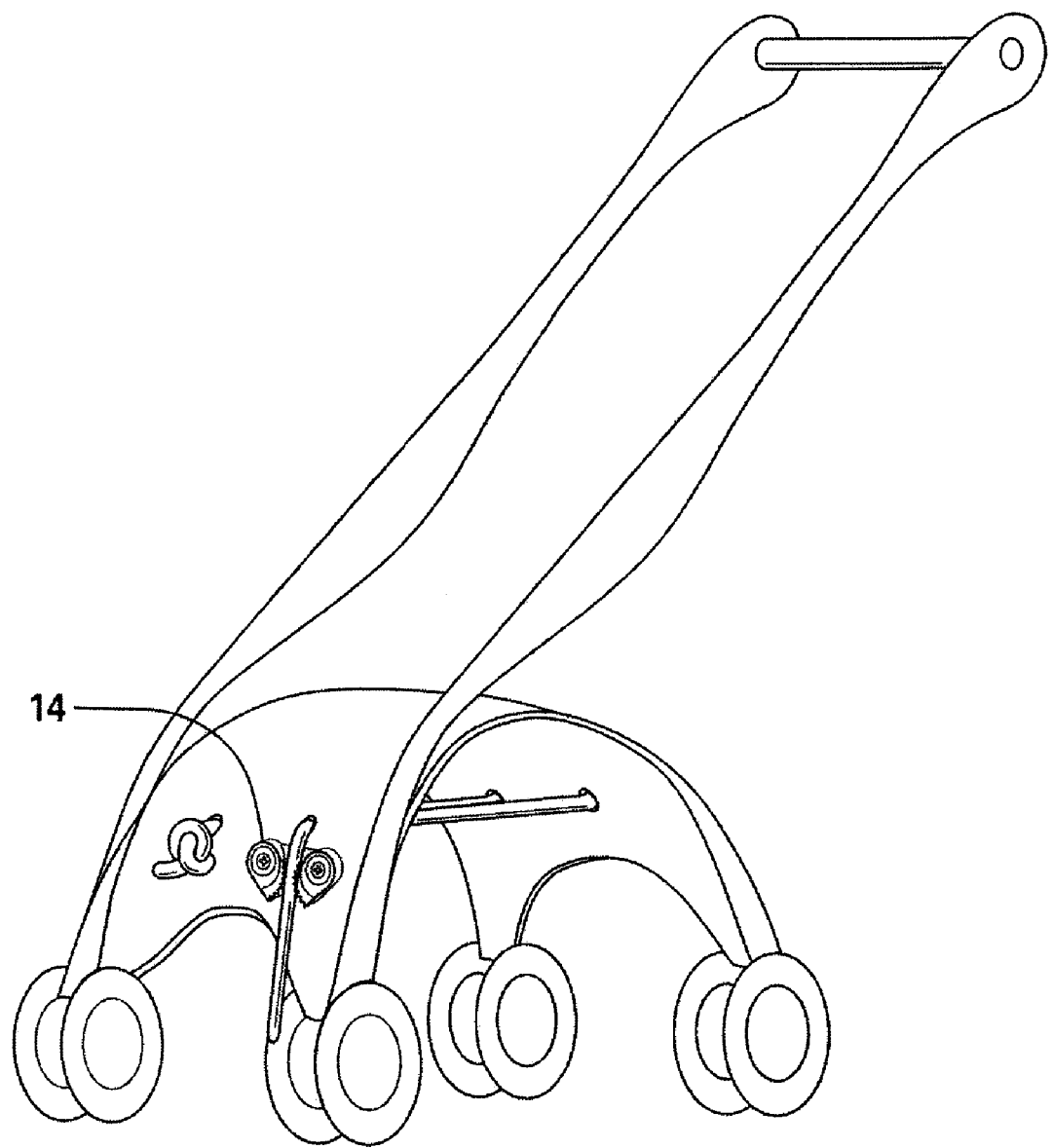
FIG. 11C is a front perspective view of the stroller of FIG. 10C in its in-use position, without the seat arrangement.
Figure 11D:
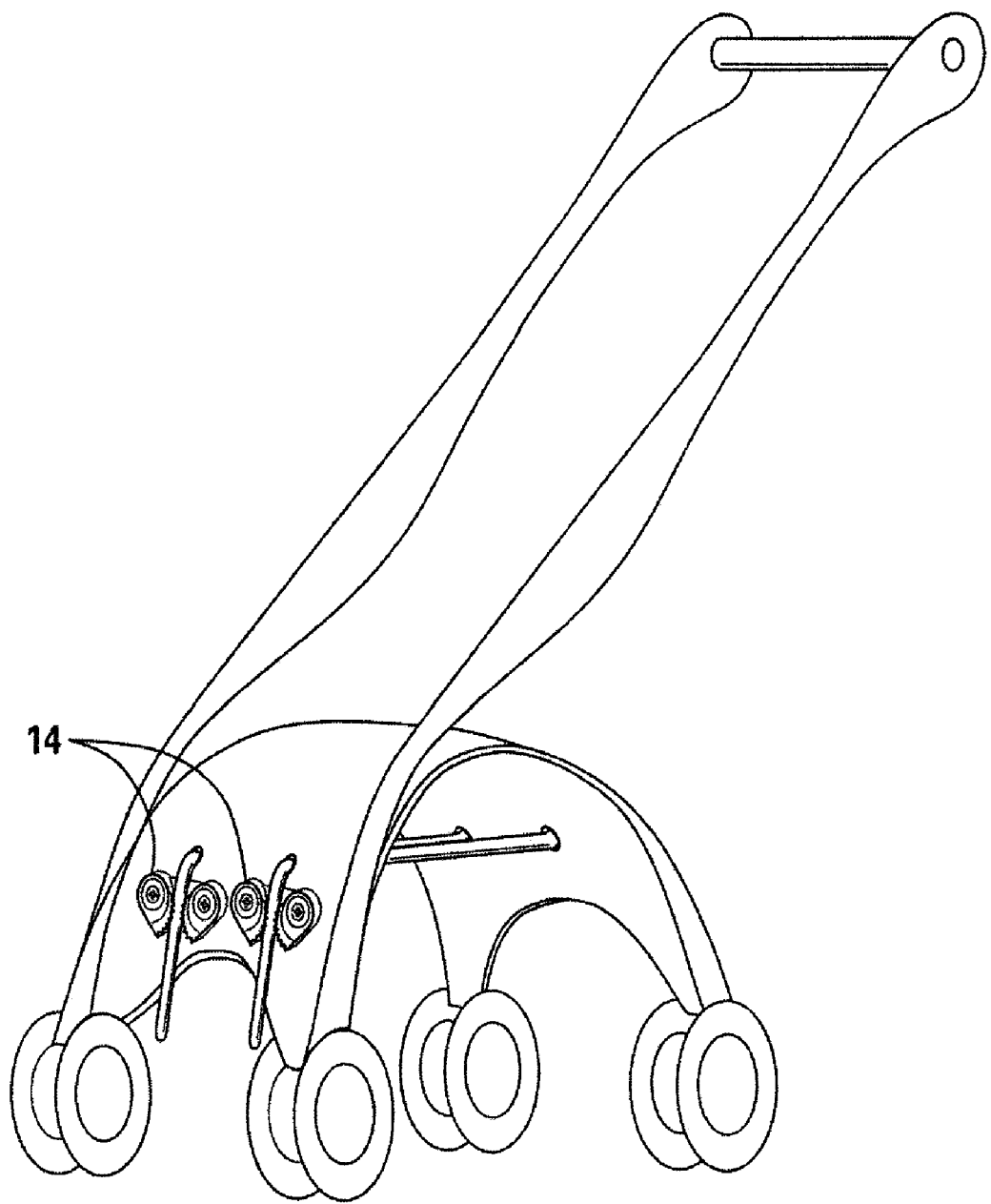
FIG. 11D is a front perspective view of the stroller of FIG. 10D in its in-use position, without the seat arrangement.
Figure 11E:
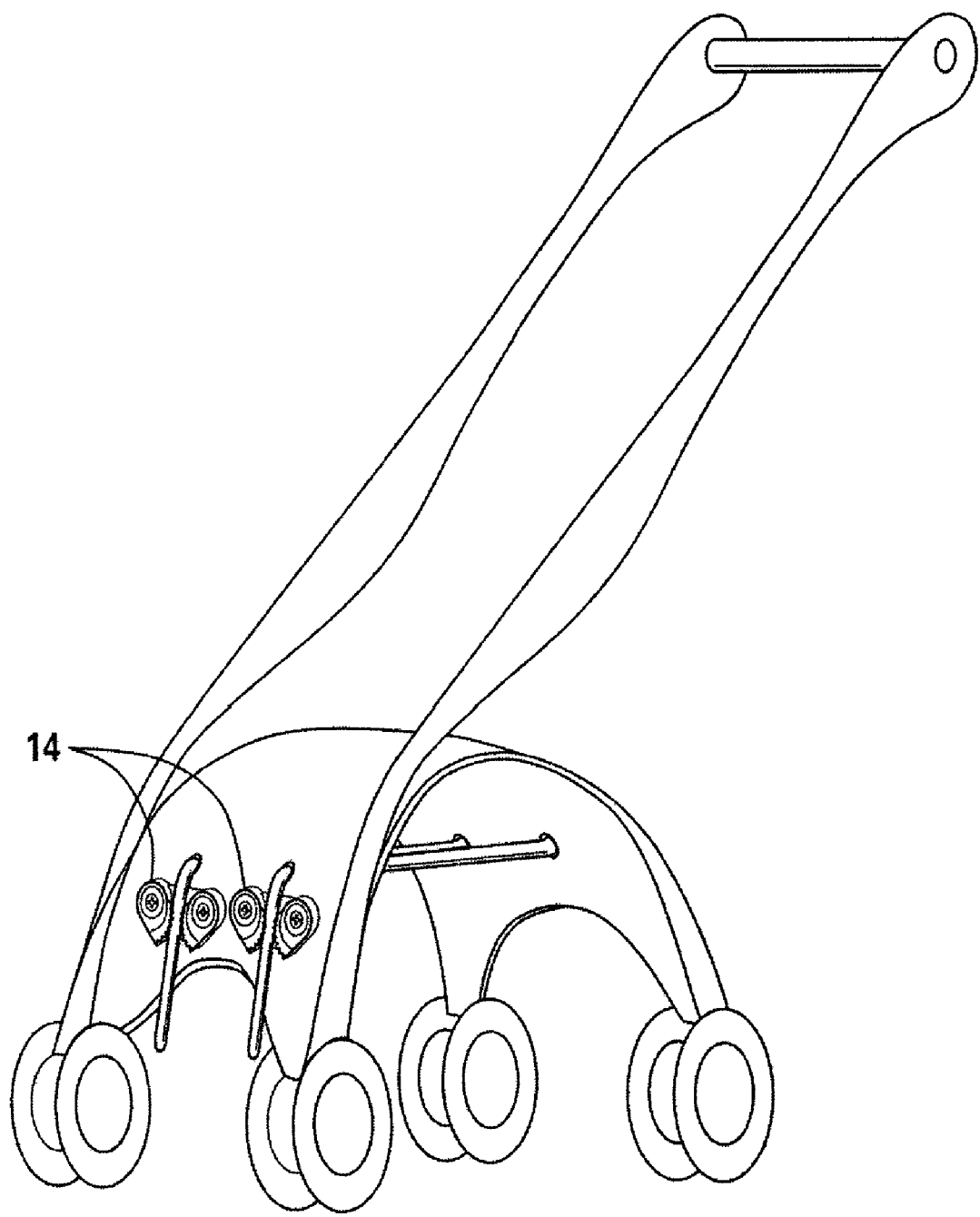
FIG. 11E is a front perspective view of the stroller of FIG. 10E in its in-use position, without the seat arrangement.

FIGS. 10A and 11A show a baby stroller based on the device of the present invention. In FIG. 10A, the stroller appears as closed, ready to be carried with the body 1 of the device in the resting position. Because the body 1 of the device is elastically deformable, both the central portion 3 and the surrounding portion 4 can be folded to an extent such that the elastically deformable body 1 reaches the desired configuration as shown in FIG. 11A. In such condition, in a preferred embodiment, the anchoring holes 10 allow installing securing elements for fastening both portions 3 and 4 into the desired position, either in the form of tensile ropes or wires or in the form of rigid rods in any of its versions.

An assembled support is thus obtained, in which other structural elements can be mounted, allowing to assemble cargo carts, baby strollers, bearing plaques, drawing board stands, musical instrument stands and other similar structures. The mounting details of such elements are not shown, though it should be readily understood by a person of ordinary skill in the art, that the type of mounting elements can be screws, nuts, bolts, but preferably rapid engagement connectors, elastic-type engagement means ("snap-ons") or box and pin-type connectors, "VELCRO-type" elements (with VELCRO-like engagement means) or by any other method known by those of ordinary skill in the art. The type of coupling will depend on the type of load to be transported due to a wide variety of weights and volumes thereof. The skilled technician will also understand that the elements mounted on the device of the present invention can be rigid, but preferably pliable so as to take a lesser space when not in use.

Figure 10C:
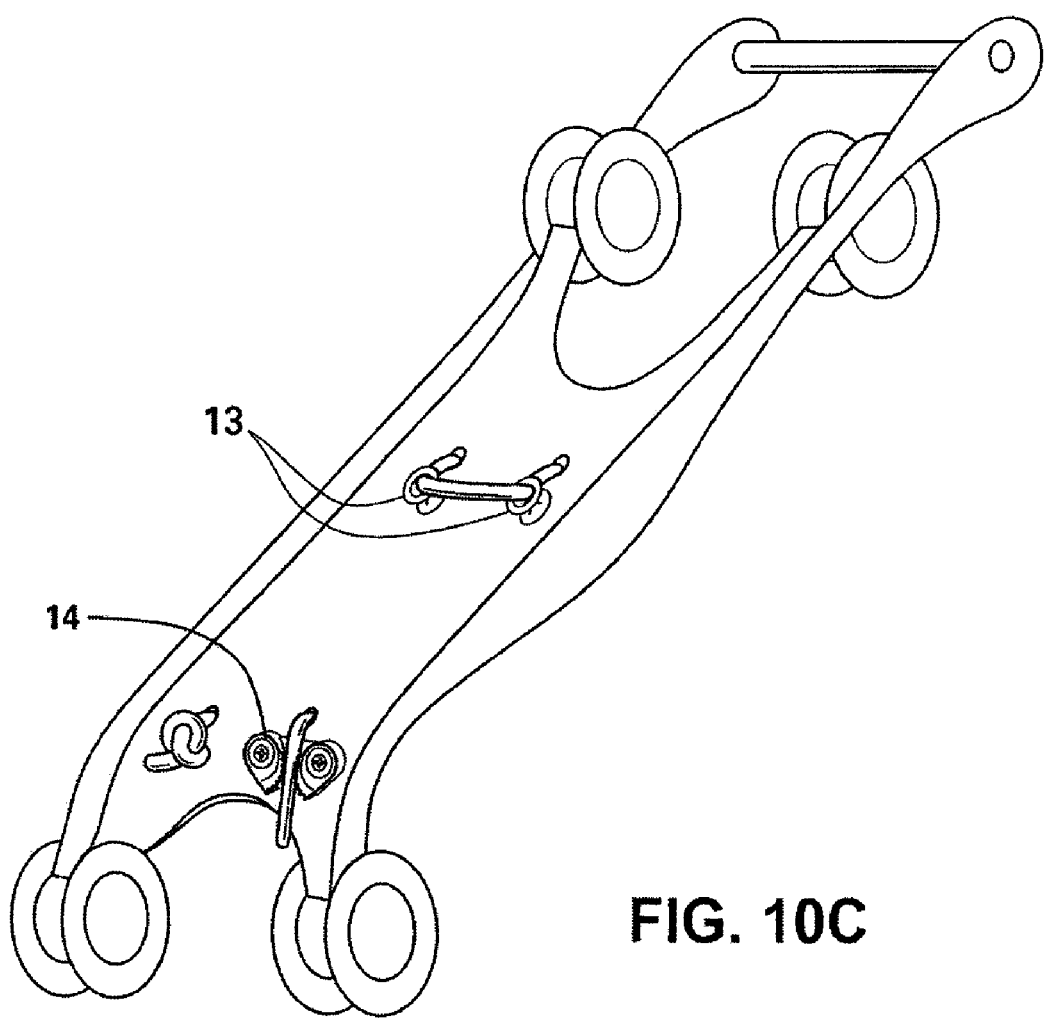
FIG. 10C shows a front perspective view of the baby stroller based on the second preferred embodiment of this invention in its resting position, showing a second embodiment of retaining means.
Figure 10D:
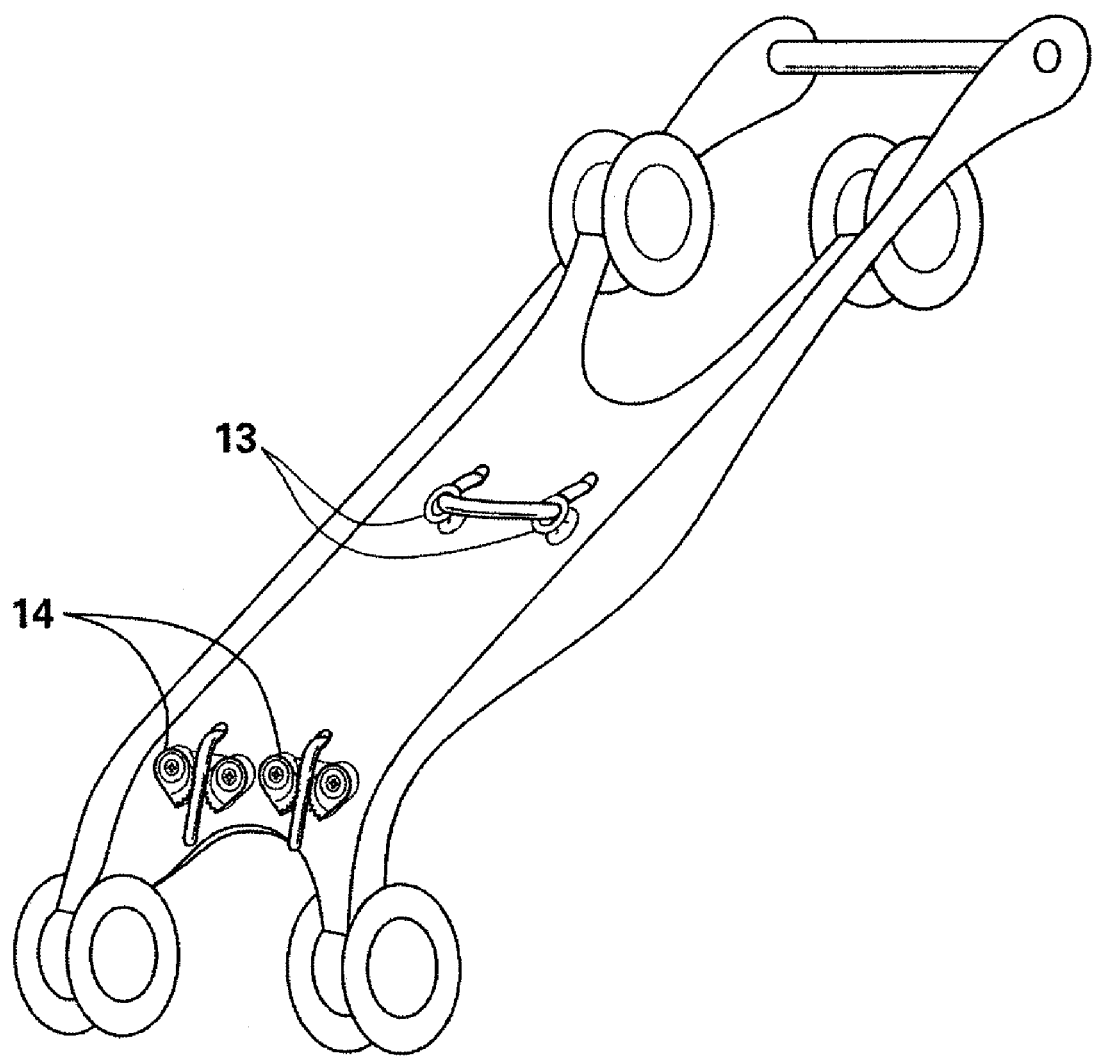
FIG. 10D shows a front perspective view of the baby stroller based on the second preferred embodiment of this invention in its resting position, showing a third embodiment of retaining means.
Figure 10E:
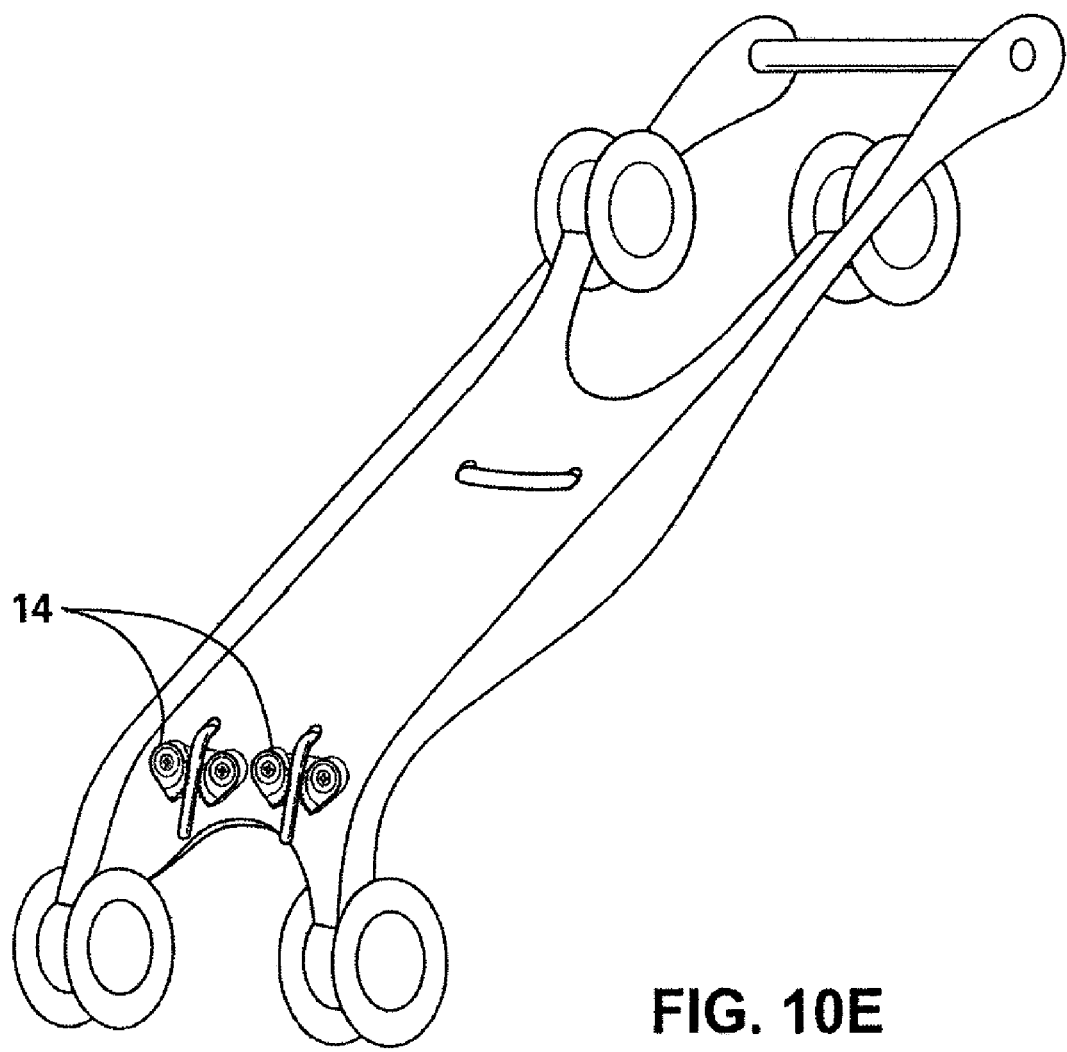
FIG. 10E shows a front perspective view of the baby stroller based on the second preferred embodiment of this invention in its resting position, showing a fourth embodiment of retaining means.

FIGS. 10B-10E show several front views of different embodiments of the device of FIGS. 10A. It may be seen in FIG. 10B that the rope may be retained at one end by a knot and at the other end by a securing element 14 as mentioned above, which may be a retainer as mentioned previously (also called "cleats"). FIG. 10C shows another embodiment of the device of FIG. 10A, in which the rope is urged to pass through a pair of anchoring rings 13 for better holding it and to enhance the frictional force that helps keen the device bent. FIG. 10D shows an embodiment in which the rope is kept in place with a retainer on each end and passing through a pair of rings. FIG. 10E shows an embodiment in which the rope is kept in place with a retainer on each end but free of anchoring rings.

FIGS. 11B-11E correspond to the device of FIGS. 10B-10E in a bent position.

FIGS. 12 and 13 also show an extremely useful application or users of elements that must be hand-carried and, in the figures it shows an embodiment for carrying a golf-club bag.

Finally, the fourth prototype including an elastic body of an arched shape and in which the side portions are bent allows combining the advantages of the previously mentioned prototypes, since it allows to resist heavier loads due to its arched shape which in turn requires a lesser effort from the user when folding it, because the folding portions are separated from each other by the central handle.

The person skilled in the art will readily understand that this example is not limitative and it shows that any of the four embodiments of this invention can be applied to implement a great number of small transport devices, either hand carried or motorized.

I claim:

1. A foldable carrier device capable of supporting various transport complementary structural elements, comprising:
   a body including a single surrounding slot therethrough forming a first portion and a second portion;
   wherein said first portion is a central portion and said second portion is a surrounding portion that, at least partially, surrounds said central portion;
   wherein said central portion is elastic and therefore capable of being bent, and capable of pivoting relative to the surrounding portion;
   wherein said central portion includes tensile means, and anchoring means for said tensile means;
   wherein said tensile and anchoring means are capable of fastening said bent central portion for keeping it in said bent position;
   wherein said tensile means are selected from ropes, wires, and rods; and
   wherein said anchoring means comprise rings attached to the pliable body and retainers attached to the tensile means.

2. The device according to claim 1, wherein said first central portion and said second surrounding portion are flat in shape when said central portion is not bent.

3. The device according to claim 1, wherein said single slot has a "U" configuration.

4. The device according to claim 1, wherein the device is made of a plastic material.

5. The device according to claim 4, wherein said plastic material is a polymer selected from the group consisting of LEXAN, DELRIN, Acetal, type-1 PVC, and polyester.

6. The device according to claim 1, wherein the device is made of rubber.

7. The device according to claim 6, wherein said rubber is a styrene-butadiene-type rubber.

8. The device according to claim 1, wherein the device is built from a material selected from the group consisting of fiberglass, polyester resin, carbon fiber, and epoxy.

9. The device according to claim 1, wherein the device is made of a metal.

10. The device according to claim 9, wherein said metal is selected from the group consisting of aluminium, phosphorous bronze, titanium, and steel.

11. The device of claim 1, wherein the device is built with a multilayer combination of a plastic material and metal.

12. The device of claim 11, wherein said multilayer combination is formed by two metal layers and a plastic layer between the two metal layers.

13. The device of claim 11, wherein said multilayer combination is formed by two plastic layers and a metal layer between the two plastic layers.

14. The device of claim 11, wherein the metal is aluminium.

15. The device of claim 11, wherein the plastic material is a polycarbonate or a polymer selected from the group consisting of LEXAN, DELRIN, Acetal, type-1 PVC, and polyester.

16. The device of claim 1, wherein the device is built with a multilayer combination of wood and metal.

17. The device of claim 16, wherein the metal is aluminium.

18. The device according to claim 1, wherein said anchoring means comprises holes and said tensile means comprises filiform elements.

19. The device according to claim 1, wherein the device has at least one front end and at least one back end that can support the weight of the device and its cargo when in use.

20. The device according to claim 1, wherein each of said ends have wheels mounted thereon.

21. The device according to claim 1, comprising a transport means selected from the group consisting of a seat cart, a golf-club bag cart, a musical instrument stand cart, and a drawing board stand cart.

22. The device according to claim 1, comprising attachment elements selected from the group consisting of screws, nuts, bolts, rapid engagement connectors, snap-on engagement devices, box and pin-type connectors, and VELCRO-like elements.

* * * * *